(12) United States Patent
Hsiung

(10) Patent No.: US 8,445,802 B2
(45) Date of Patent: May 21, 2013

(54) BUTTON STRUCTURE OF PORTABLE ELECTRONIC DEVICE

(75) Inventor: Ming-Chun Hsiung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 377 days.

(21) Appl. No.: 12/905,220

(22) Filed: Oct. 15, 2010

(65) Prior Publication Data

US 2012/0048697 A1 Mar. 1, 2012

(30) Foreign Application Priority Data

Aug. 27, 2010 (CN) .......................... 2010 1 0264798

(51) Int. Cl.
*H01H 3/12* (2006.01)
(52) U.S. Cl.
USPC ....................................... 200/341; 200/302.2

(58) Field of Classification Search
USPC .................................. 200/330–332, 341–345
See application file for complete search history.

(56) References Cited

U.S. PATENT DOCUMENTS 7,019,237 B2* 3/2006 Hong ............................ 200/296
7,884,293 B2* 2/2011 Ulomek ..................... 200/61.76

* cited by examiner

*Primary Examiner* — Tulsidas C Patel
*Assistant Examiner* — Marina Fishman
(74) *Attorney, Agent, or Firm* — Altis Law Group, Inc.

(57) ABSTRACT

A button structure includes a pressing member and a housing. The pressing member has a plate portion and a pressing portion protruding from the plate portion, and the plate portion is elastic. The housing has an end wall defining a through hole. The pressing member is assembled in the housing, a portion of the plate portion is fixed on the end wall, and the pressing portion extends through the through hole. The plate portion pivots relative to the end wall by pressing the pressing portion.

17 Claims, 5 Drawing Sheets

BUTTON STRUCTURE OF PORTABLE ELECTRONIC DEVICE

BACKGROUND

1. Technical Field

The present disclosure relates to button structures of portable electronic devices.

2. Description of the Related Art

Portable electronic devices, such as mobile phones and personal digital assistants, may have a button as a power switch. However, the button structure can be complex and not easy to assemble.

Therefore, there is room for improvement within the art.

BRIEF DESCRIPTION OF THE DRAWINGS

Many aspects of the present button structure of portable electronic device can be better understood with reference to the following drawings. The components in the drawings are not necessarily drawn to scale, the emphasis instead being placed upon clearly illustrating the principles of the present button structure of portable electronic device. Moreover, in the drawings, like reference numerals designate corresponding parts throughout the several views.

DETAILED DESCRIPTION

Figure 1:
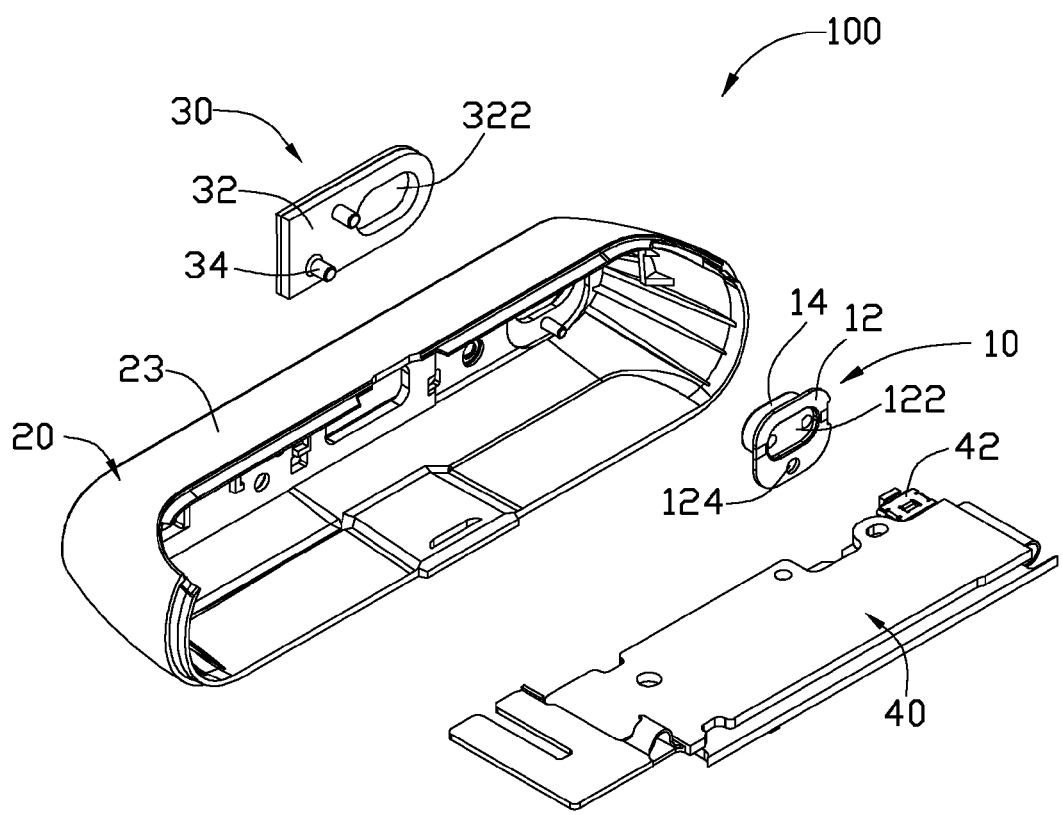
FIG. 1 is an exploded isometric view of a button structure of portable electronic device according to an exemplary embodiment.
Figure 2:
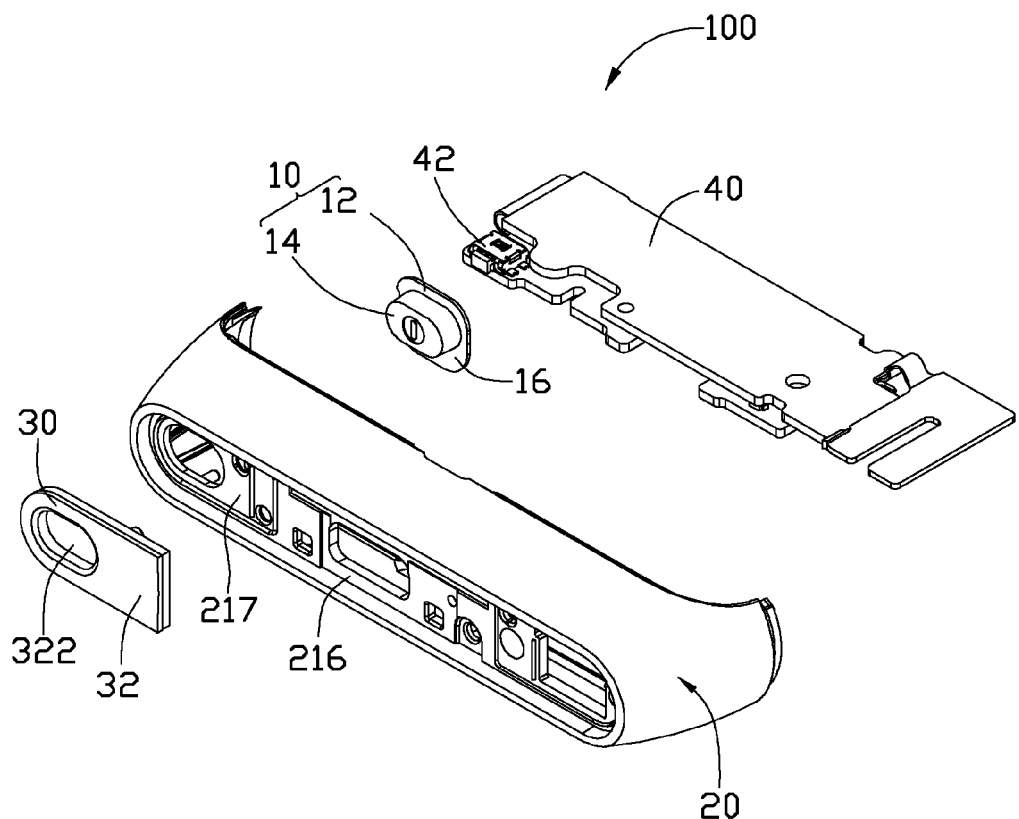
FIG. 2 is an exploded isometric view of the button structure shown in FIG. 1 from another view.

FIG. 1 shows an exemplary embodiment of a button structure 100 for a portable electronic device. The button structure 100 includes a pressing member 10, a housing 20, an engaging member 30, and a circuit board 40. The pressing member 10 and the engaging member 30 can be assembled in the housing 20, the circuit board 40 has a switch 42, and the pressing member 10 engages with the switch 42.

The pressing member 10 includes a plate portion 12, a pressing portion 14 protruding from the plate portion 12, and a peripheral flange 16 formed on the plate portion 12 surrounding the pressing portion 14. The plate portion 12 is generally rectangular and is made of an elastic material, such as thermoplastic polyurethane (TPU). The plate portion 12 defines a resisting hole 122 and a latching hole 124. The resisting hole 122 can be aligned with the pressing portion 14 and receive a portion of the switch 42. The latching hole 124 is defined through the peripheral flange 16. The pressing portion 14 is generally a post. The pressing portion 14 can be made of a rigid plastic material such as Polycarbonate (PC). The pressing portion 14 can be integrally formed with the plate portion 12 using dual-injection molding.

Figure 3:
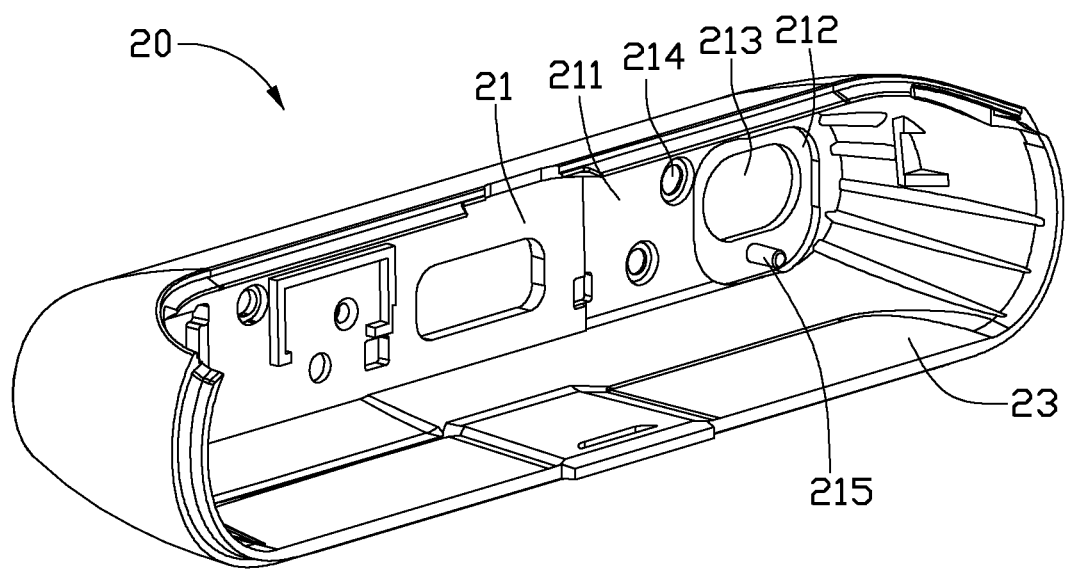
FIG. 3 is an isometric view of a housing of the button structure shown in FIG. 1.

Referring to FIG. 3, the housing 20 includes an end wall 21 and a peripheral wall 23 perpendicularly extending from the periphery of the end wall 21. The end wall 21 has an internal surface 211 and an opposite external surface 216. A receiving recess 212 and two fixing holes 214 are defined in the internal surface 211. The receiving recess 212 has substantially the same shape and size as the plate portion 12 of the pressing member 10. The receiving recess 212 can receive the plate portion 12. A through hole 213 is defined at the bottom of the receiving recess 212 and a latching post 215 is formed on the bottom of the receiving recess 212. The through hole 213 is for allowing the pressing portion 14 to pass through. The latching post 215 is positioned adjacent to the through hole 213. The latching post 215 can be resilient and can be latched into the latching hole 124 of the pressing member 10. The two fixing holes 214 extend through the end wall 21 and the engaging member 30 engages in the fixing holes 214. An engaging recess 217 is defined in the external surface 216. The through hole 213 and the fixing holes 214 extend through the end wall 21 and communicate with the engaging recess 217. The engaging recess 217 corresponds to the engaging member 30 in size and shape and can receive the engaging member 30.

The engaging member 30 includes a main plate 32 and two fixing posts 34 protruding from the main plate 32. The main plate 32 can be received in the engaging recess 217 of the housing 20. The main plate 32 defines a through engaging hole 322 having substantially the same shape and size as the through hole 213. The engaging hole 322 can be aligned with the through hole 213 for receiving the pressing portion 14. The fixing posts 34 can be resilient and latch in the fixing holes 214 of the housing 20.

Figure 4:
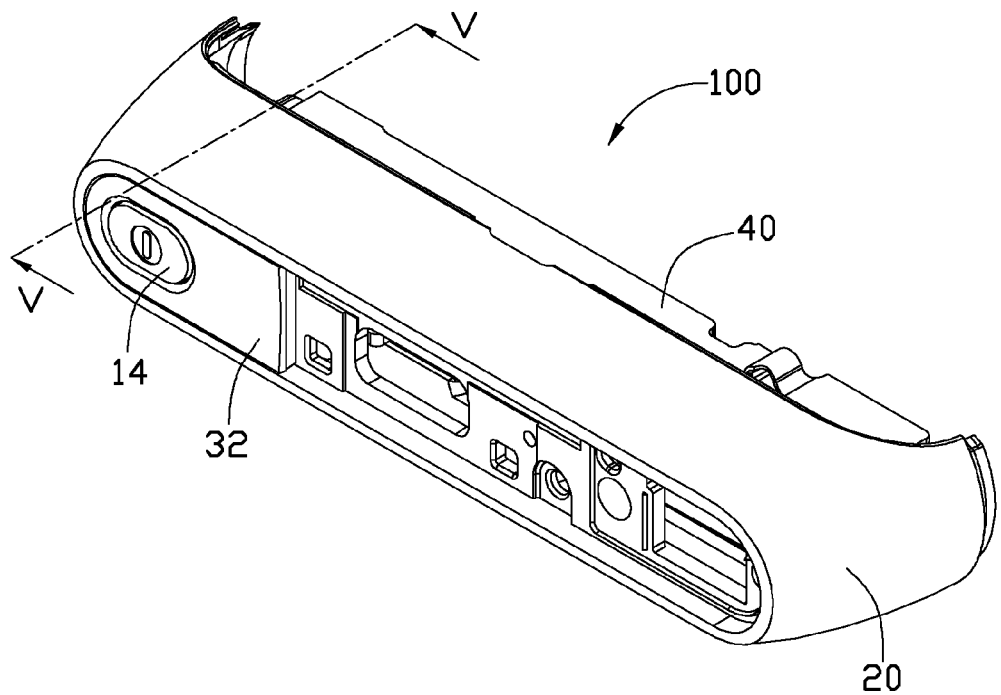
FIG. 4 is an assembled isometric view of the button structure shown in FIG. 1.
Figure 5:
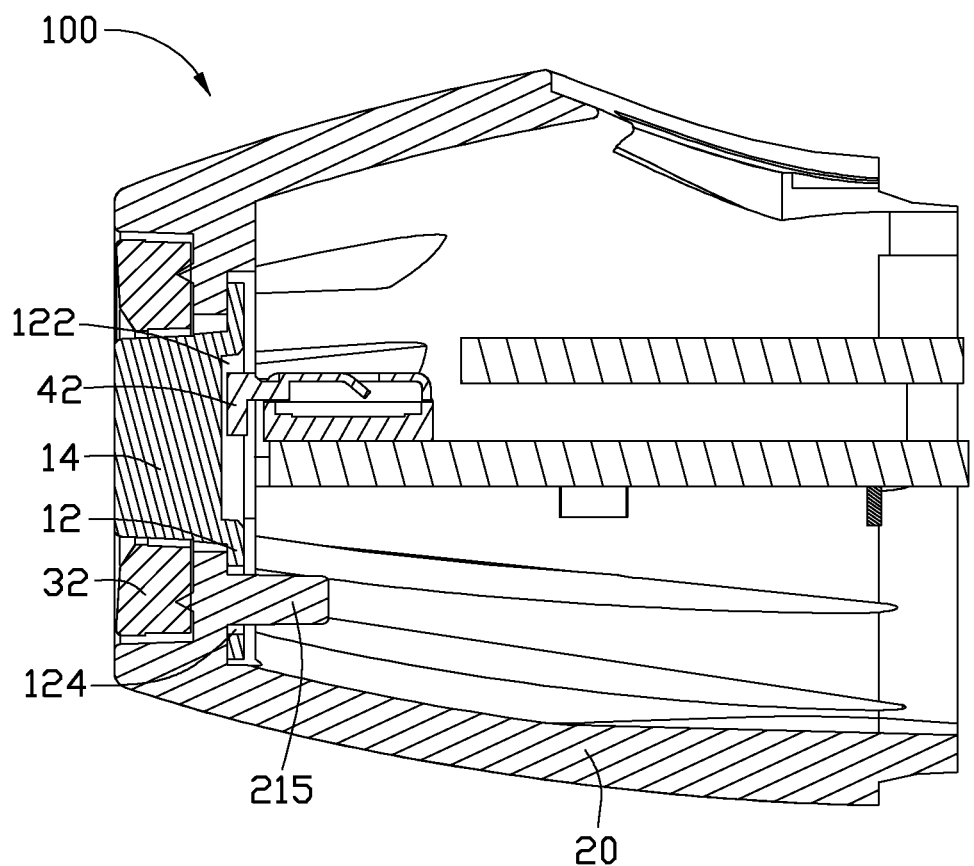
FIG. 5 is a cut-away view of the button structure shown in FIG. 4 along the line V-V.

Referring FIGS. 4 and 5, to assemble the button structure 100, the pressing member 10 is assembled into the housing 20. The plate portion 12 is received in the receiving recess 212, and the pressing portion 14 extends through the through hole 213, and the latching post 215 of the housing 20 extends into and secures to the latching hole 124 of the pressing member 10. Thus the engaging member 30 is assembled, and the main plate 32 is received in the engaging recess 217 of the housing 20. The fixing posts 34 are received into the fixing holes 214 of the housing 20. The pressing portion 14 engages in the engaging hole 322. Thus, the pressing member 10 and the engaging member 30 are secured to the housing 20. Then, the circuit board 40 is assembled in the housing 20, and the switch 42 is received in the resisting hole 122 to resist against the bottom surface of the resisting hole 122 and assembly of the button structure 100 is complete.

When the pressing portion 14 is pressed, due to the securing of the latching post 215 in the latching hole 124 and the elasticity of the plate portion 12, the plate portion 12 pivots on the latching post 215 to contact and trigger the switch 42. After the external force is released, the pressing member 10 returns to the original state by the elastic force of the plate portion 12.

It is understood that the latching post 215 can be secured to the pressing member 10 by hot melting. Specifically, the latching post 215 can extend through the latching hole 124, and the distal end of the latching post 215 is melted by heating. The fixing posts 34 can be secured to the fixing holes 214 by hot melting as well.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A button structure, comprising:
a pressing member having a flat plate portion and a pressing portion protruding from the plate portion, the plate portion being elastic;
an engaging member; and
a housing having an end wail defining a through hole; wherein:
the pressing member is assembled in the housing, the engaging member is assembled outside of the housing, the engaging member is secured on a first side of the end wall, the flat plate portion is parallel to and abuts against a second side of the end wall, a portion of the plate portion secures on the end wall, and the pressing portion extends through the through hole and is exposed from the engaging member, the plate portion can pivot relative to the end wall by pressing the pressing portion.

2. The button structure as claimed in claim 1, wherein the pressing member forms a peripheral flange, the peripheral flange defines a latching hole, the end wall forms a latching post beside of the through hole, the latching post latches into the latching hole.

3. The button structure as claimed in claim 2, wherein the end wall defines a receiving recess in the internal surface to receive the plate portion, the through hole is defined at the bottom of the receiving recess, and the latching post is formed on the bottom of the receiving recess.

4. The button structure as claimed in claim 1, wherein the pressing portion is integrally formed with the plate portion are using dual-injecting molding, the plate portion is made of elastic material, and the pressing portion is made of hard plastic material.

5. The button structure as claimed in claim 4, wherein the plate portion is made of thermoplastic polyurethanes, and the pressing portion is made of polycarbonate.

6. The button structure as claimed in claim 1, wherein the the end wall defines an engaging recess in the external surface to receive the engaging member.

7. The button structure as claimed in claim 6, wherein the engaging member includes a flat main plate defining a through engaging hole, the engaging hole aligns with the through hole after the engaging member assembled in the end wall to receive the pressing portion.

8. The button structure as claimed in claim 6, wherein the engaging member includes two fixing posts protruding from the main plate, the end wall defines correspondingly two fixing holes, the two posts latch in the two fixing holes.

9. The button structure as claimed in claim 1, wherein the button structure includes a circuit board, the circuit board has a switch arranged thereon, the plate portion defines a resisting hole opposite to the pressing portion to receive the switch.

10. A portable electronic device, comprising:
a pressing member having a plate portion and a pressing portion protruding from the plate portion, the plate portion being elastic;
a housing having an end wall defining a through hole; and
a circuit board having a switch arranged thereon; wherein:
the pressing member is assembled in the housing, a portion of the plate portion secures on the end wall, and the pressing portion passes through the through hole, the circuit board is assembled in the housing, the switch resists against the pressing portion, the plate portion can pivot relative to the end wall by pressing the pressing portion to trigger the switch, the portable electronic device includes an engaging member, the end wall defines an engaging recess in the external surface to receive the engaging member.

11. The portable electronic device as claimed in claim 10, wherein the pressing member forms a peripheral flange, the peripheral flange defines a latching hole, the end wail forms a latching post beside the through hole, the latching post latches into the latching hole.

12. The portable electronic device as claimed in claim 11, wherein the end wall defines a receiving recess in the internal surface to receive the plate portion, the through hole is defined at the bottom of the receiving recess, and the latching post is formed on the bottom of the receiving recess.

13. The portable electronic device as claimed in claim 10, wherein the pressing portion with the plate portion are integrally formed by way of double-injecting molding, the plate portion is made of elastic material, and the pressing portion is made of hard plastic material.

14. The portable electronic device as claimed in claim 12, wherein the plate portion is made of thermoplastic polyurethanes, and the pressing portion is made of polycarbonate.

15. The portable electronic device as claimed in claim 10, wherein the engaging member includes a main plate defining a through engaging hole, the engaging hole aligns with the through hole after the engaging member assembled in the end wall to receive the pressing portion.

16. The portable electronic device as claimed in claim 10, wherein the engaging member includes two fixing posts protruding from the main plate, the end wall defines correspondingly two fixing holes, the two posts latch into the two fixing holes.

17. The portable electronic device as claimed in claim 14, wherein the plate portion defines a resisting hole opposite to the pressing portion to receive the switch.

* * * * *